Nov. 29, 1949
T. G. CRIDER
2,489,754
FARM FREEZER EVAPORATOR
Filed Nov. 30, 1946
3 Sheets-Sheet 1
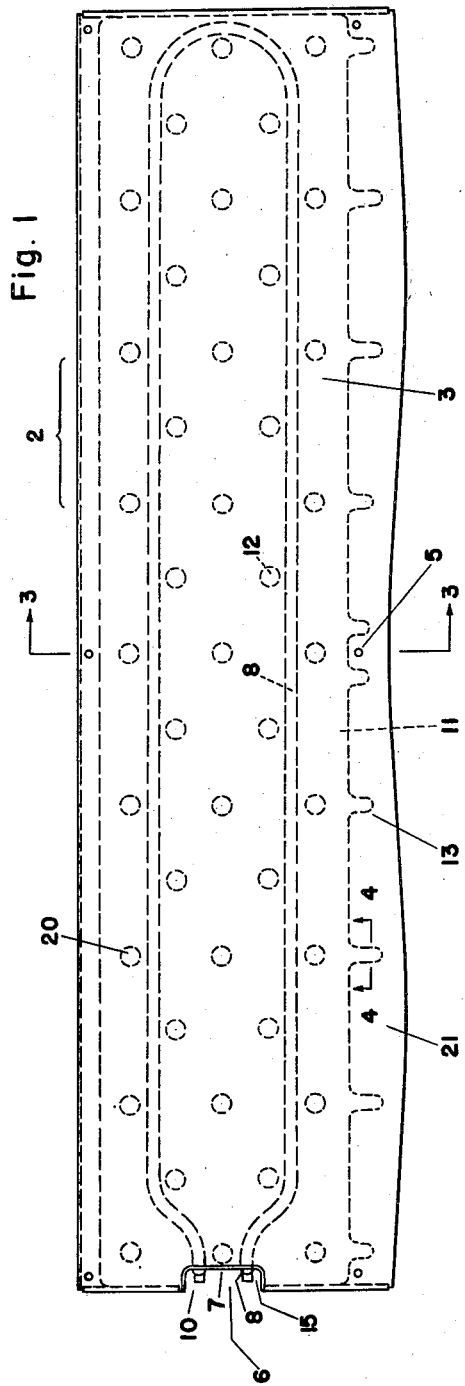
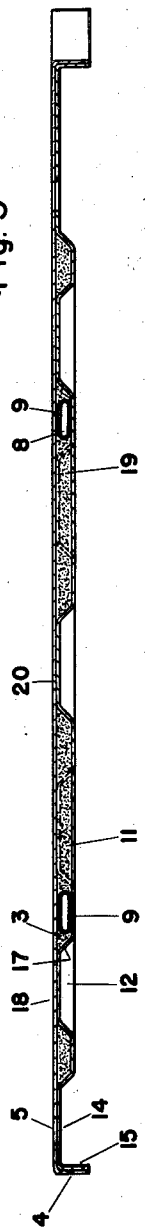
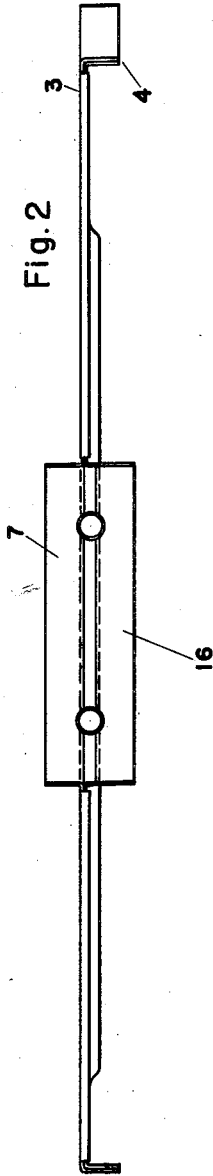
INVENTOR.
Thomas G. Crider
BY Nov. 29, 1949  T. G. CRIDER  2,489,754
FARM FREEZER EVAPORATOR
Filed Nov. 30, 1946  3 Sheets-Sheet 2
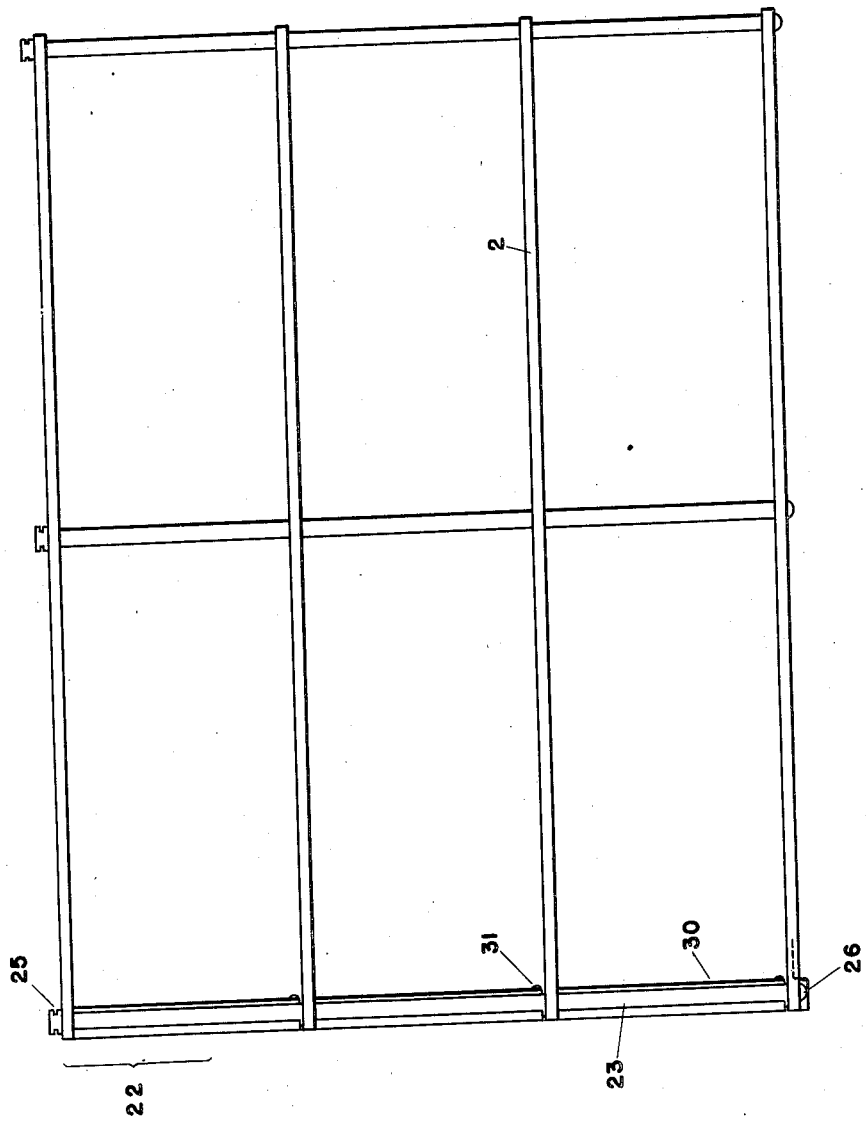
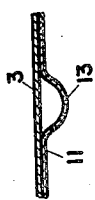
INVENTOR.
Thomas G. Crider
BY Nov. 29, 1949     T. G. CRIDER     2,489,754
FARM FREEZER EVAPORATOR Filed Nov. 30, 1946     3 Sheets-Sheet 3

INVENTOR.
Thomas G. Crider
BY

Patented Nov. 29, 1949

2,489,754

UNITED STATES PATENT OFFICE 2,489,754

FARM FREEZER EVAPORATOR

Thomas G. Crider, Lima, Ohio, assignor to Carrier Corporation, Syracuse, N. Y., a corporation of Delaware Application November 30, 1946, Serial No. 713,307

10 Claims. (Cl. 62—126)

This invention relates to heat exchangers and more particularly to a refrigerant evaporator designed for use in a refrigeration cabinet of the freezer type to enable the storage compartment thereof to be maintained at a desired temperature.

The chief object of the present invention is to provide a novel and improved evaporator unit of simple economical design adapted to be disposed readily and quickly in place in an evaporator.

An object of the present invention is to provide a novel evaporator adapted to be inserted in the storage compartment of a refrigeration cabinet, the units of the evaporator dividing the compartment into sections and preventing turbulent flow of air between the sections while being capable of use as shelves for products to be stored in the compartment.

A further object is to provide a novel and improved evaporator unit adapted to permit free passage of refrigerant through a coil therein to maintain a storage compartment at a desired temperature.

A still further object is to provide an evaporator unit including improved means of securing the various elements of the unit to one another.

A still further object is to provide a method of assembling an evaporator unit.

A still further object is to provide a method of assembling a heat exchanger such as an evaporator. Other objects of my invention will be readily perceived from the following description of my invention.

This invention relates to an evaporator unit for use in a refrigeration cabinet of the freezer type and comprises a first plate-like member, a coil having opposite flattened surfaces disposed adjacent the first member with a flattened surface thereof disposed in direct heat contacting relation with the interior or lower surface of said member, a second member disposed adjacent the coil having portions thereof in direct heat contacting relation with the opposite flattened surface of the coil and having other portions in direct contact with the lower surface of the first member and a plurality of spot welds at the portions of the members in contact with one another holding the members in fixed position. Preferably, the spaces between such members are filled with a heat absorbing material capable of preventing penetration of moisture into the spaces between the members and which serves to increase the rigidity of the structure. It is an important feature of my invention that the heat absorbing material so used does not interfere to any substantial extent with the direct heat conducting relationship between the members and the coil. The present invention also relates to an evaporator assembly including a plurality of evaporator units of the type described and to the method of assembling the evaporator unit as well as the evaporator.

The attached drawings illustrate a preferred embodiment of my invention, in which:

Figure 1 is a plan view of the evaporator unit of my invention;

Figure 2 is a view in end elevation of the evaporator unit shown in Figure 1;

Figure 3 is a sectional view taken on the line 3—3 of Figure 1;

Figure 4 is a sectional view taken on the line 4—4 of Figure 1;

Figure 5 is a view in front elevation of the evaporator of my invention; and

Figure 6:
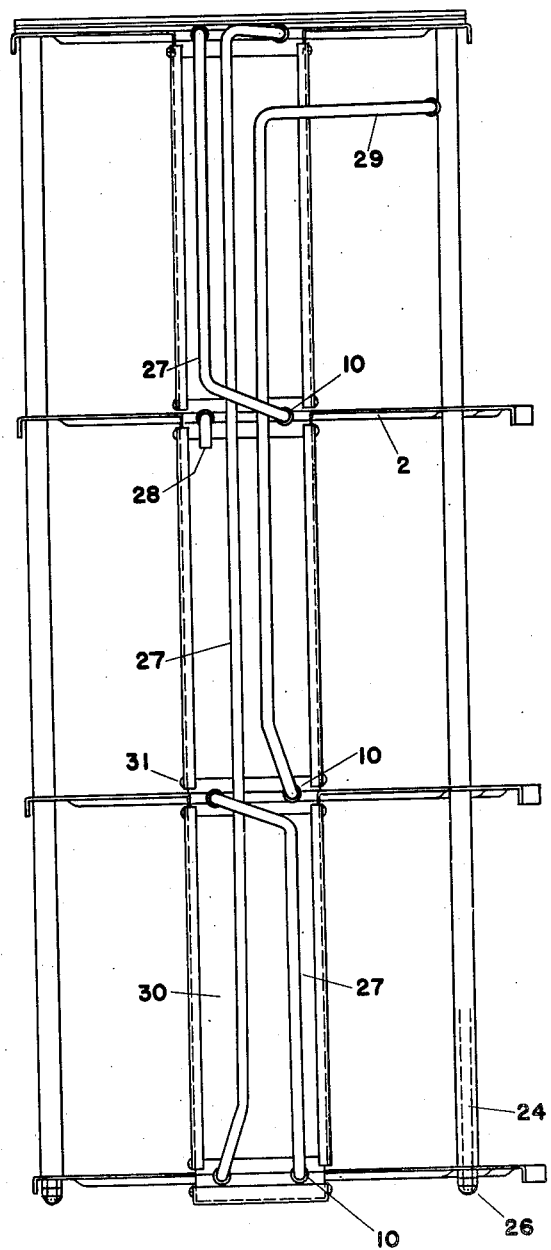
Figure 6 is a view in side elevation of the evaporator shown in Figure 5.

Referring to the drawing there is shown an evaporator unit designated at 2. The evaporator unit consists of a plate-like member 3 of inverted pan-like configuration and formed preferably of any suitable heat conductive material such as aluminum. Member 3, preferably, is of considerably greater length than width. At its longitudinal edges it is provided with flanges 4 for a purpose hereinafter described. A plurality of openings 5 extend through member 3. The front surface of member 3 preferably is contoured to cooperate with the doors of a refrigeration cabinet in which the unit is disposed in order to prevent turbulent flow of air between sections of the storage compartment as hereinafter described.

Preferably member 3 is provided with a recessed portion 6 as shown in Figure 1. Flanges 7 extend about recessed portion 6 and extend upwardly from the plane of member 3. Flanges 7 are adapted to engage a shield section as hereinafter described.

A refrigeration coil 8 is disposed adjacent member 3. Coil 8 is provided with opposite flattened surfaces 9; one of such flattened surfaces 9 is placed in direct heat conducting relation with the lower face of member 3. Coil 8 terminates in headers 10 as hereinafter described.

Disposed adjacent coil 8 is a second plate-like member 11 of inverted pan-like configuration and formed preferably of the same material as member 3. Member 11 is provided with a plurality of spaced circular indentations 12 disposed in rows extending longitudinally and laterally of the unit, indentations in each row being offset from indentations in an adjacent row. Preferably, one longitudinal side of member 11 is provided with a plurality of lug-like indentations 13 adapted to strengthen and reinforce the unit. The front surface of member 11 is contoured similarly to the front surface of member 3 as described above. Openings 14 similar to openings 5 are provided in member 11 and are adapted to be placed in alignment with openings 5 when the unit is assembled to permit insertion of spacer rods through the unit.

The longitudinal edges of member 11 terminate in downwardly extending flanges 15 adapted to contact the downwardly extending flanges 4 of member 3. If desired, the laterally extending edges of member 3 may be provided with similar flanges, although such flanges may be omitted. Member 11 is also provided with a recessed portion 15 similar to the recessed portion 6 of member 3 except that flanges 16 surrounding portion 15 extend downward.

The indentations 12 are best shown in Figure 3. Each indentation includes upwardly extending walls 17 and terminates in a horizontal base portion 18 adapted to be disposed in direct contact with the lower face of member 3.

Coil 6 may include one or more loops, the sections thereof extending preferably longitudinally of the unit between adjacent rows of indentations as shown in Figure 1.

Preferably, the spaces between members 3 and 11 are filled with a heat absorbing material 19 of asphaltic composition. Such material serves to prevent penetration of moisture into the spaces between the members 3 and 11 thereby preventing corrosion of the inner surfaces of members 3 and 11, renders the structure more rigid and does not interfere with the direct heat conducting relation between the flattened surfaces 9 of coil 8 and members 3 and 11.

In order to render the description of the evaporator unit of my invention more clear I will describe the method of assembly thereof. Member 3 is formed in inverted pan-like configuration with its flanges 4 extending downwardly. Member 11 is similarly die-shaped except that it is provided with indentations or dimples 12 and reenforcing ribs 13 as heretofore explained. The coil 8 of one or more loops is disposed between members 3 and 11, the elements of the coil extending longitudinally of members 3 and 11 and between adjacent rows of indentations 12 in plate 11. It will be noted the flattened surfaces 9 of coil 8 are disposed in direct heat contacting relationship with members 3 and 11. The indentations 12 of member 10 have their bases 18 in direct contact with the lower face of member 3.

Members 3 and 11 are urged toward one another thereby securely engaging the flattened surfaces 9 of coil 8 with the adjacent faces of members 3 and 11 and are held in such position while a plurality of spot welds 20 are formed in the indentations 12. The spot welds 20 securely hold members 3 and 11 in fixed relation to one another with their inner faces in direct heat conducting relation with the flattened surfaces 9 of coil 8. It will be noted flanges 4 and flanges 15 extend adjacent one another. Preferably, a plurality of spot welds 21 are formed longitudinally of the unit adjacent such flanges or in the flanges to aid in securing the plate-like members to one another. The end flanges 4 of member 3 extend downward concealing member 11 or if desired, the end flanges may be bent inwardly over member 11. If member 11 be provided with similar flanges, it will be understood such flanges are disposed adjacent one another. In my invention it is not necessary that such flanges be interlocked. It is desirable, however, that the raw edges of the downwardly extending flanges be wire brushed, for example, in order to remove any irregularities therein. In the assembled unit 2 it will be noted that flanges 7 and 16 extend upward and downward about the recessed portions 6 and 15. Such flanges are adapted to extend adjacent shield sections in the evaporator which serve to conceal the lines connecting the coils of the various units as hereinafter described. After the unit 2 is assembled, the recesses or spaces between members 3 and 11 are filled with a suitable heat absorbing material 19 as above described and the unit is ready for assembly in an evaporator.

An evaporator 22 including a plurality of units 2 is shown in Figures 5 and 6. The evaporator 22 comprises a plurality of units 2 secured in fixed relation to one another by means of suitable spacers 23 passing through openings 5 in the units and held in position by means of spacing rods 24 (refer to Figure 6). Trolleys 25 are fastened to the opposite end of spacers 23 to prevent movement of units 2 in one direction while fastening members 26 prevent movement of units 2 in the opposite direction.

The coils 8 of the various units 2 are attached to one another by means of suitable lines or tubes 27 and are provided with line 28 leading to a source of supply of refrigerant and with a line 29 adapted to return refrigerant after its passage through coils 8 to the source of supply. Such lines are connected to headers 10 of the various coils 6 as above described. In order to conceal and protect the various connecting lines 27, 28 and 29 when the evaporator is in use a shield 30, formed in a plurality of sections is provided adapted to fit thereover. Shield 30 is secured in place in the evaporator by suitable fastening means 31 extending through the flanges of members 3 and 11 of the various units. The evaporator, preferably, is adapted to be connected to a source of refrigerant and to be disposed in a refrigeration cabinet in the storage compartment thereof as an integral portion of the refrigeration unit.

In assembling the evaporator a unit 2 is assembled on spacer rods 24 and secured in place by fastening means 26, spacers 23 disposed in rods 24, a second unit placed thereover and additional spacers and units are provided until the evaporator comprises the desired number of units. Then trolleys 25 are secured to the protruding ends of the spacer rods 24 in order to secure the units in fixed position and to prevent movement thereof. The coils 8 of the various units are connected by means of lines 27 and lines 28 and 29 are provided attaching the various units 2 to a suitable source of supply of refrigerant. The structure is then filled with refrigerant and is ready for insertion in a suitable refrigeration cabinet. The shield 30 is secured in position protecting and concealing the various lines. It will be appreciated the evaporator so disclosed is capable of removal from a refrigeration cabinet as an integral portion of the refrigeration system. In the cabinet, preferably, the evaporator is supported in desired position suspended by means of trolleys 25 from suitable tracks.

One of the more important features of the present invention resides in the fact that the evaporator unit and method of construction is economical in cost; the unit is quickly and easily assembled while the evaporator formed of such units is likewise quickly and easily assembled and possesses the advantage of removability with the remaining elements of the refrigeration system as an integral portion of the system.

The present invention has greatly decreased the cost of manufacture of evaporators of a type desirable for use in refrigeration cabinets of the freezer type in which it is requisite that low temperatures be maintained at all times in order to protect products stored therein from spoilage. The units of the present invention are rigid, strong in construction, and are not susceptible to corrosion of the inner surfaces during use. More uniform conduction is provided throughout the surface of the plate members due to the fact that a greater area of the coil is in heat conducting relation with the plates composing the unit. This is a highly desirable feature of my invention and it is requisite that the moisture material provided between such plates does not interfere to any substantial extent with such direct heat conducting relation.

My invention permits the units of the evaporator to be used as shelves for the storage of products in the refrigeration cabinet; so doing, permits a less expensive freezer structure to be provided for it is not necessary to provide additional shelves to receive stored products. The front surfaces of the evaporator units are contoured to substantially engage the inner surfaces of the doors of the cabinet when such doors are closed to prevent the turbulent movement of air throughout the storage compartment, thus decreasing the cost of operation of the structure in use.

While I have described and illustrated a preferred embodiment of my invention, it will be understood my invention is not limited thereto since it may be otherwise embodied within the scope of the following claims.

I claim:

1. In a refrigerant evaporator unit, the combination of a plate-like member, a refrigerant conduit disposed adjacent thereto in direct heat conducting relation with respect to the lower face of said member, a second plate-like member disposed on the opposite side of said conduit in direct heat conducting relation therewith, said second member having a plurality of spaced indentations therein spaced from its edges, the bottom surface of at least some of the indentations being disposed in contact with said first member, means in said indentations securing the members in fixed relation to one another, and a layer of heat absorbing material disposed between said members serving to prevent infiltration of moisture between said members without interference with the direct heat conducting relationship between the conduit and said members.

2. In a refrigerant evaporator unit, the combination of a plate-like member, a refrigerant coil disposed adjacent thereto in direct heat conducting relation with respect to the lower face of said member, a second plate-like member disposed on the opposite side of said coil in direct heat conducting relation therewith, said member having a plurality of spaced indentations therein spaced from its edges, the bottom surface of at least some of said indentations being disposed in contact with said first member, a plurality of spot welds formed in said indentations securing the plates in fixed relation to one another, and a layer of heat absorbing material disposed between said members serving to prevent infiltration of moisture therebetween without interference with the direct heat conducting relation of the coil with said members.

3. In a refrigerant evaporator unit, the combination of a plate-like member, a refrigerant coil having opposite flattened surfaces disposed adjacent thereto, a flattened surface of said coil being disposed in direct heat conducting relation with respect to the lower face of said member, a second plate-like member disposed on the opposite side of said coil and having its inner surface in direct heat conducting relation with respect to the opposite flattened surface of said coil, said second member having a plurality of spaced circular indentations formed therein, the bottom surface of at least some of said indentations being disposed adjacent the lower face of said first member, a plurality of spot welds in said indentations securing the plates in fixed relation to one another, and a layer of heat absorbing material disposed between said members serving to prevent infiltration of moisture therebetween without interference with the direct heat conducting relation of the coil and said members.

4. In a refrigerant evaporator unit, the combination of a plate-like member terminating in a plurality of downwardly extending flanges, a flattened refrigerant coil disposed adjacent said member in direct heat conducting relation with respect to the lower face of said member, a second plate-like member disposed on the opposite side of said coil in direct heat conducting relation therewith and terminating in flanges disposed adjacent the flanges of said first member, said second member having a plurality of spaced circular indentations therein, the bottom surface of at least some of said indentations being in contact with said first member, spot welds in said indentations securing the members in fixed relation to one another, spot welds joining at least some of the flanges of said members, and a layer of heat absorbing material disposed between said members serving to prevent infiltration of moisture therebetween without interference with the direct heat conducting relation of the coil and said members.

5. A refrigerant evaporator unit according to claim 2 in which the indentations are disposed in rows extending longitudinally and laterally of the unit, indentations in one row being offset from indentations in a second row.

6. In a refrigerant evaporator unit, the combination of a plate-like member of relatively great length as compared to width, a flattened refrigerant coil disposed adjacent said member, a flattened surface of the coil being disposed in direct heat conducting relation with respect to the lower face of said member, a second plate-like member of relatively great length as compared to width disposed on the opposite side of said coil, a flattened surface of the coil being disposed in direct heat conducting relation with said second member, said first member terminating in a plurality of downwardly extending flanges, said second member terminating in a plurality of downwardly extending flanges disposed adjacent the flanges of said first member, said second member having a plurality of spaced circular indentations therein, the indentations being disposed in rows extending longitudinally and laterally of said member, indentations in one row being offset from indentations in an adjacent row, the bottom surface of at least some of said indentations being in contact with said first member, spot welds in said indentations securing the plates in fixed relation to one another, spot welds attaching longitudinally extending flanges to one another, and a layer of heat absorbing material disposed between said members serving to prevent infiltration of moisture therebetween without interference with the direct heat conducting relation of the coil and said members.

7. In a refrigerant evaporator, the combination of a plurality of evaporator unit members, each of said members comprising a plate-like member, a refrigerant conduit disposed adjacent thereto in direct heat conducting relation with respect to the lower face of said member, a second member disposed on the opposite side of said conduit in direct heat conducting relation therewith, said second member having a plurality of indentations therein, the bottom surface of at least some of the indentations being disposed in contact with the lower face of said first member, means in said indentations securing the members in fixed relation to one another, and a layer of heat absorbing material disposed between said members serving to prevent infiltration of moisture between said members without interference with the direct heat conducting relationship between the coil and said members, rods supporting said unit members, locking means fixing said members in spaced relation to one another, and lines connecting the conduits of the units to one another and to a source of refrigerant, said lines serving to supply refrigerant to the conduits of the unit members for passage therethrough and to return refrigerant to the source of supply, a shield for concealing and protecting the connecting lines when the assembly is disposed in a refrigerator cabinet, and means for securing the shield in desired position.

8. In a refrigerant evaporator, the combination of a plurality of evaporator unit members, each of said members comprising a plate-like member, a refrigerant coil disposed adjacent thereto in direct heat conducting relation with respect to the lower face of said member, a second member disposed on the opposite side of said coil in direct heat conducting relation therewith, said second member having a plurality of spaced indentations therein, the bottom surface of at least some of said indentations being disposed adjacent said first member, a plurality of spot welds formed in said indentations securing the plates in fixed relation to one another, and a layer of heat absorbing material disposed between said members serving to prevent infiltration of moisture therebetween without interference with the direct heat conducting relation of the coil with said members, rods supporting said unit members in spaced relation to one another, and lines connecting the coils of said unit members to one another and to a source of supply of refrigerant, said lines serving to supply refrigerant to the coils of the units for passage therethrough and to return the refrigerant to the source of supply.

9. In a refrigerant evaporator, the combination of a plurality of evaporator unit members, each of said members comprising a plate-like member, a refrigerant coil having flattened surfaces disposed adjacent thereto, a flattened surface of the coil being disposed in direct heat conducting relation with respect to the lower face of said member, a second plate-like member disposed on the opposite side of said coil and having its inner surface in direct heat conducting relation to a second flattened surface of said coil, said second member having a plurality of spaced circular indentations formed therein, the bottom surface of at least some of said indentations being disposed adjacent the lower face of said first member, a plurality of spot welds in said indentations securing the plates in fixed relation to one another, and a layer of heat absorbing material disposed between said members serving to prevent infiltration of moisture therebetween without interference with the direct heat conducting relation of the coil and said members, rods supporting said unit members in spaced relation to one another, and lines connecting the coils of said unit members to one another and to a source of refrigerant, the lines serving to supply refrigerant to the coils of the units for passage therethrough and to return the refrigerant to the source of supply.

10. In a refrigerant evaporator, the combination of a plurality of unit evaporator members, each of said members comprising a plate-like member of relatively great length as compared to width, a flattened refrigerant coil disposed adjacent said member in direct heat conducting relation with respect to the lower face of said member, a second plate-like member of relatively great length as compared to width disposed on the opposite side of said coil with its inner surface in direct heat conducting relation with a flattened surface thereof, said first member terminating in a plurality of downwardly extending flanges, the second member terminating in a plurality of downwardly extending flanges disposed adjacent the flanges of said first member, said second member having a plurality of spaced circular indentations therein, the indentations being disposed in rows extending longitudinally and laterally of said member, indentations in one row being offset from indentations in an adjacent row, the bottom surface of at least some of said indentations being in contact with the inner surface of the first member, spot welds in said indentations securing the plates in fixed relation to one another, spot welds attaching longitudinally extending flanges of said members to one another, and a layer of heat absorbing material disposed between said members serving to prevent infiltration of moisture therebetween without interference with the direct heat conducting relation of the coil and the members, rods supporting said unit members in spaced relation to one another, means for locking said members in place on said supporting rods, lines connecting the coils of the unit members to one another and to a source of supply of refrigerant, said lines serving to supply refrigerant to the coils of the unit members for passage therethrough and to return the refrigerant to the source of supply, a shield for protecting and concealing said lines when the assembly is disposed in a refrigerator cabinet, and means for securing the shield in desired position.

THOMAS G. CRIDER.

REFERENCES CITED

The following references are of record in the file of this patent:

UNITED STATES PATENTS

| Number | Name | Date |
|---|---|---|
| 1,751,317 | Gail | Mar. 18, 1930 |
| 1,829,387 | Arnold | Oct. 27, 1931 |
| 1,868,907 | King | July 26, 1932 |
| 1,975,046 | Larkin | Sept. 25, 1934 |
| 2,014,703 | Smith | Sept. 17, 1935 |
| 2,124,110 | Hall | July 19, 1938 |
| 2,231,012 | Kleist | Feb. 11, 1941 |
| 2,327,355 | Kleist | Aug. 24, 1943 |
| 2,405,432 | Kleist | Aug. 6, 1946 |